T. WILSON.
Corn Planter.
No. 28,931. Patented June 26, 1860.
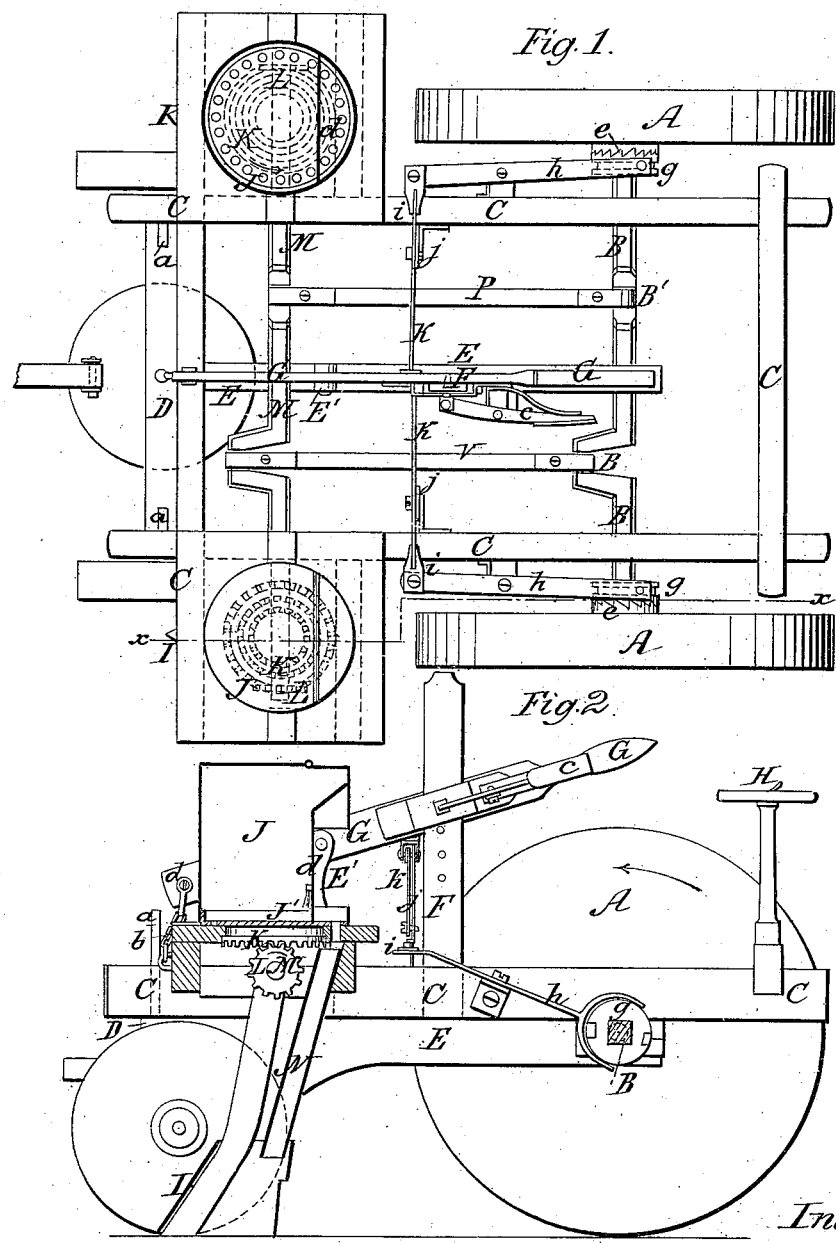
Witnesses:
J. W. Coombes.
R. S. Spencer
Inventor:
Thos. Wilson
per Munn & Co.
Attys.

UNITED STATES PATENT OFFICE.

THOMAS WILSON, OF WINTERSET, IOWA.

IMPROVEMENT IN SEEDING-MACHINES.

Specification forming part of Letters Patent No. 28,931, dated June 26, 1860.

*To all whom it may concern:*

Be it known that I, THOMAS WILSON, of Winterset, in the county of Madison and State of Iowa, have invented certain new and useful Improvements in Seeding-Machines; and I do hereby declare that the following is a full, clear, and exact description thereof, reference being had to the accompanying drawings, making a part of this specification, in which—

Figure 1 represents a plan view of the machine complete. Fig. 2 is a vertical longitudinal section taken through the red line $x$ $x$ marked on Fig. 1.

Similar letters of reference indicate corresponding parts in both figures.

This invention is an improvement in mechanism for effecting the dropping of seed from the hopper of a double drill or hill seeding machine; and it consists in a novel arrangement of cranks, connecting-rods, and gearing placed in a carriage-frame for operating the seed-distributers, in connection with a means for raising the front of this frame and at the same time throwing the parts out of gear, for the purpose of moving the machine about from place to place without dropping the seed, the parts being so arranged that they may be thrown into gear by the driver at any moment, as will be hereinafter described and represented.

To enable those skilled in the art to fully understand my invention, I will proceed to describe its construction and operation.

In the drawings, A A represent the two hind wheels, that have very wide rims, so that they will serve the purpose of coverers or rollers for the seed when they have been deposited into the ground. These wheels are placed loosely on the ends of an axle, B, which has two cranks, B' B', that are placed at opposite angles to each other, so that their through motion will be alternate. Upon this axle rests the rear end of a frame, C, that carries the seeding apparatus. This frame C proceeds forward of the wheels A and rests on the bolster D of the front running-gear, but is not bolted to it, the uprights $a$ $a$ serving merely as guides to keep the frame C in its place, allowing its end to have a vertical play.

The front running-gear is attached to the bolster by a king-bolt with a fifth-wheel interposed. This bolster is connected with the hind axle, B, by a strong reach, E, from which proceed up a fulcrum-bar, E', and a guide and stop bar, F, for a lever, G, the front end of which is attached to the front end of the frame C by a chain, $v$, and the rear end of this lever extends back so as to be convenient to the driver, who sits on the seat H. This lever is attached to the bar F by a spring-bolt, that is operated by a lever-key, $e$, at the option of the driver, so that he can, by depressing the lever G, raise the front of the frame C, and with it the plows I I, and thus stop the motion of the seeding arrangement, as will be hereinafter described.

On each side of the front part of frame C are placed the seed-hoppers J J, which are cylindrical, and stand in an upright state, as shown in Figs. 1 and 2. Portions of these hopper-boxes are cut out behind and partitions $d$ $d$ placed in them to prevent the seed from falling out, as shown in Fig. 2. The bottoms J' J' of these hoppers are circular plates, that are furnished with any suitable number of perforations, according to the quantity of seed to be deposited in the earth, either in hills or in drills. These plates have a rotary motion given to them by surface-toothed wheels K, that have two, three, or four circles of teeth, as shown in Fig. 1 in dotted lines, and these wheels K are driven by pinion spur-wheels L L, that are keyed to a crank-shaft, M. Said pinions are keyed to their shaft M by set-screws, which may be loosened and the pinions brought nearer to the axes of the wheels K, for giving a faster motion to the hopper-bottoms. The seed is conducted from the hopper by the perforated plates J' J' and dropped into the seed-tubes N, which conduct the seed down and drop it into the drill immediately in rear of the plows I I and between the two landsides or wings of each plow. Then the wheels A A come along and cover up and press the earth about the seed.

The shaft M is operated by connecting-rods P P, that connect with cranks B' B' of axle B, when the wheels A A are clutched with it, and this is done by securing to the inside of the hub of each wheel A a toothed ring, $e$, and with a sliding clutch-ring, $g$, placed on the shaft in front of it. The shaft may be made to turn with the wheels when the frame C rests on the bolster D and the seed-tubes and plows are on the ground. To effect this the sliding clutch-rings $g$ $g$ are operated so as to be brought against the surface of the toothed ring e by levers h h, connecting-arms i i, levers j j, and toggle-arms k k, that are each jointed to the main lever G. Thus by operating this lever G the front end of the frame—hoppers, plows, and all—may be raised or depressed. At the same time the wheel C C will be clutched to or disengaged from the shaft B.

Having thus described my invention, what I claim as new, and desire to secure by Letters Patent, is—

The arrangement of frame C set forth, in combination with the lever G, toggle-levers k k, and clutching devices e e g g, as set forth, whereby the dropping of the seed may be stopped and the plows raised from the ground at the same time.

THOS. WILSON.

Witnesses:
W. S. RUDEROW,
ABIHU WILSON.